(12) United States Patent
Galbreath et al.

(10) Patent No.: US 9,561,744 B2
(45) Date of Patent: Feb. 7, 2017

(54) THORACIC SUPPORT ASSEMBLY FOR A SEAT BACK

(71) Applicants: Lear Corporation, Southfield, MI (US); Winsen C. Zouzal, Detroit, MI (US)

(72) Inventors: Ashford Allen Galbreath, Troy, MI (US); Thomas S. Hicks, Livonia, MI (US); Walter T. Cichocki, Brighton Township, MI (US); Richard L. Harbaugh, South Lyon, MI (US); Winsen C. Zouzal, Detroit, MI (US)

(73) Assignee: Lear Corporation, Southfield, MI (US)

( * ) Notice: Subject to any disclaimer, the term of this patent is extended or adjusted under 35 U.S.C. 154(b) by 307 days.

(21) Appl. No.: 14/445,639

(22) Filed: Jul. 29, 2014

(65) Prior Publication Data
US 2016/0031351 A1 Feb. 4, 2016

(51) Int. Cl.
*B60N 2/64* (2006.01)
*B60N 2/66* (2006.01)

(52) U.S. Cl.
CPC ............... *B60N 2/64* (2013.01); *B60N 2/643* (2013.01); *B60N 2/66* (2013.01)

(58) Field of Classification Search
CPC ........... B60N 2/663; B60N 2/666; B60N 2/64; B60N 2/643; B60N 2/646
USPC ...................................................... 297/284.7
See application file for complete search history.

(56) References Cited

U.S. PATENT DOCUMENTS

| | | | |
|---|---|---|---|
| 3,086,817 A * | 4/1963 | Wilfert | A47C 7/282 297/284.7 |
| RE27,176 E * | 9/1971 | Froelich | A47C 7/46 297/284.7 |
| 4,143,909 A | 3/1979 | McFarlin | |
| 4,597,386 A | 7/1986 | Goldstein | |
| 4,718,724 A | 1/1988 | Quinton et al. | |
| 5,054,854 A | 10/1991 | Pruit | |
| 5,101,811 A * | 4/1992 | Brunswick | A47C 7/425 297/112 |
| 5,335,965 A * | 8/1994 | Sessini | A47C 7/425 297/284.4 |
| D359,192 S * | 6/1995 | Franklin, III | D6/596 |
| 5,433,505 A | 7/1995 | Coyne et al. | |
| 5,567,011 A * | 10/1996 | Sessini | B60N 2/0232 297/284.4 |
| D383,027 S * | 9/1997 | Riedell | D6/596 |
| 5,707,108 A | 1/1998 | Pi | |

(Continued)

FOREIGN PATENT DOCUMENTS

DE 9100735 U1 4/1991
EP 0706911 A2 4/1996

OTHER PUBLICATIONS

European Patent Office, Extended Search Report for the corresponding European Patent Application No. 15177292.8 dated Jan. 11, 2016.

(Continued)

*Primary Examiner* — Timothy J Brindley
(74) *Attorney, Agent, or Firm* — Brooks Kushman P.C.

(57) ABSTRACT

A thoracic support assembly for a seat back of a seat assembly. The thoracic support assembly may include a cover and a thoracic support pad. The thoracic support pad may be movable with respect to the cover and may be configured to support at least a portion of a thoracic region of a user's spine.

20 Claims, 6 Drawing Sheets

(56) References Cited

U.S. PATENT DOCUMENTS

| | | | |
|---|---|---|---|
| 6,079,784 A * | 6/2000 | Peachey | B60N 2/6036 |
| | | | 297/284.5 |
| 6,471,294 B1 * | 10/2002 | Dammermann | A47C 7/24 |
| | | | 297/284.4 |
| 6,527,339 B2 * | 3/2003 | Voris | B60N 2/2881 |
| | | | 297/219.12 |
| 7,059,678 B1 | 6/2006 | Taylor | |
| 8,585,141 B2 | 11/2013 | Limpaitoon | |
| 2002/0043842 A1 * | 4/2002 | Nakamori | A47C 7/46 |
| | | | 297/284.5 |
| 2004/0245811 A1 * | 12/2004 | Bevan | A47C 7/425 |
| | | | 297/180.12 |
| 2008/0001452 A1 | 1/2008 | Schmitz et al. | |
| 2013/0226053 A1 * | 8/2013 | Khan | A47C 7/021 |
| | | | 601/134 |

OTHER PUBLICATIONS

United States Patent and Trademark Office, Unpublished International Application No. PCT/US2013/66365, filed Oct. 23, 2013.
United States Patent and Trademark Office, U.S. Appl. No. 14/200,870, filed Mar. 7, 2014.

* cited by examiner

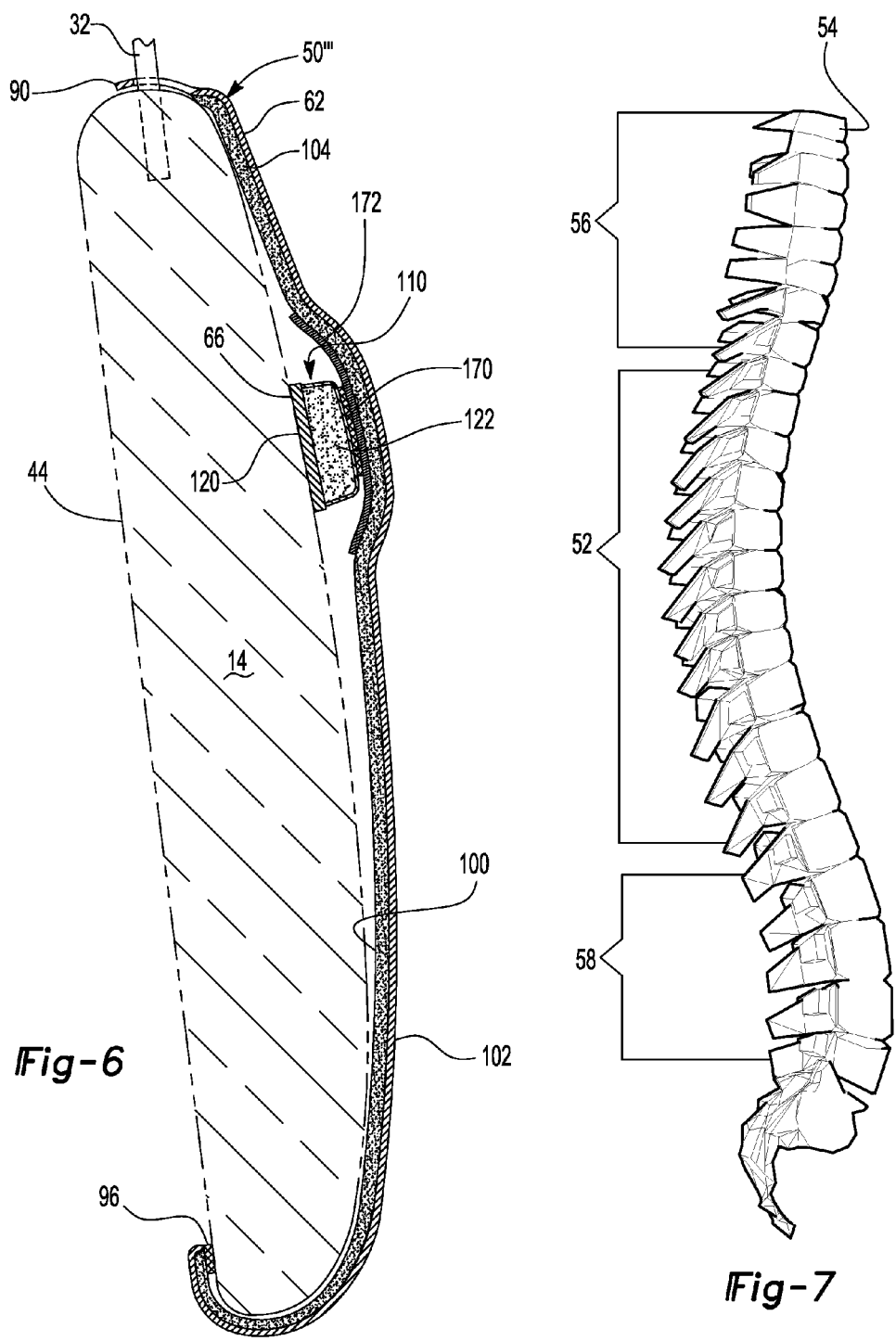

US 9,561,744 B2

THORACIC SUPPORT ASSEMBLY FOR A SEAT BACK

TECHNICAL FIELD

This patent application relates to a thoracic support assembly for a seat back.

BACKGROUND

A lumbar support device is disclosed in U.S. Pat. No. 8,585,141.

SUMMARY

In at least one embodiment, a thoracic support assembly for a seat back of a seat assembly is provided. The thoracic support assembly may include a backing, a cover, a thoracic support pad, a first adjustment strap, and a second adjustment strap. The backing may be adapted to be disposed on the seat back. The backing may have an upper end and a lower end disposed opposite the upper end. The cover may be disposed proximate the backing. The thoracic support pad may be movably disposed between the backing and the cover. The first adjustment strap may extend from the thoracic support pad toward the upper end. The second adjustment strap may extend from the thoracic support pad toward the lower end. The first adjustment strap and the second adjustment strap may cooperate to adjust the position of the thoracic support pad to support at least a portion of a thoracic region of a user's spine.

In at least one embodiment, a thoracic support assembly for a seat back of a seat assembly is provided. The thoracic support assembly may include a backing, a cover, and a thoracic support pad. The backing may be adapted to be disposed on the seat back. The backing may have an upper end and a lower end disposed opposite the upper end. The cover may be disposed proximate the backing. The cover may have a first cover surface, a second cover surface, and a first slot. The first cover surface may be disposed proximate the backing. The second cover surface may be disposed opposite the first cover surface. The thoracic support pad may be movably disposed between the backing and the cover. The thoracic support pad may have a first adjustment tab that may extend through the first slot and that may be disposed proximate the second cover surface for adjusting a position of the thoracic support pad.

In at least one embodiment, a thoracic support assembly for a seat back of a seat assembly is provided. The thoracic support assembly may include a cover, an upper mounting feature, a thoracic support pad, and an engagement feature. The cover may be adapted to be disposed on a seat back. The cover may have a first cover surface, a second cover surface, an upper end, and a lower end. The first cover surface may be adapted to face toward the seat back. The second cover surface may be disposed opposite the first cover surface. The lower end may be disposed opposite the upper end. The upper mounting feature may be disposed proximate the upper end of the cover and may be adapted to mount the thoracic support assembly to the seat back. The thoracic support pad may be positionable on the first cover surface. The engagement feature may couple the thoracic support pad to the cover proximate the first cover surface and may permit the thoracic support pad to be positioned to support at least a portion of a thoracic region of a user's spine.

BRIEF DESCRIPTION OF THE DRAWINGS

FIG. 6 is a section view of the thoracic support assembly of FIG. 5.

FIG. 7 illustrates various regions of a human spine.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
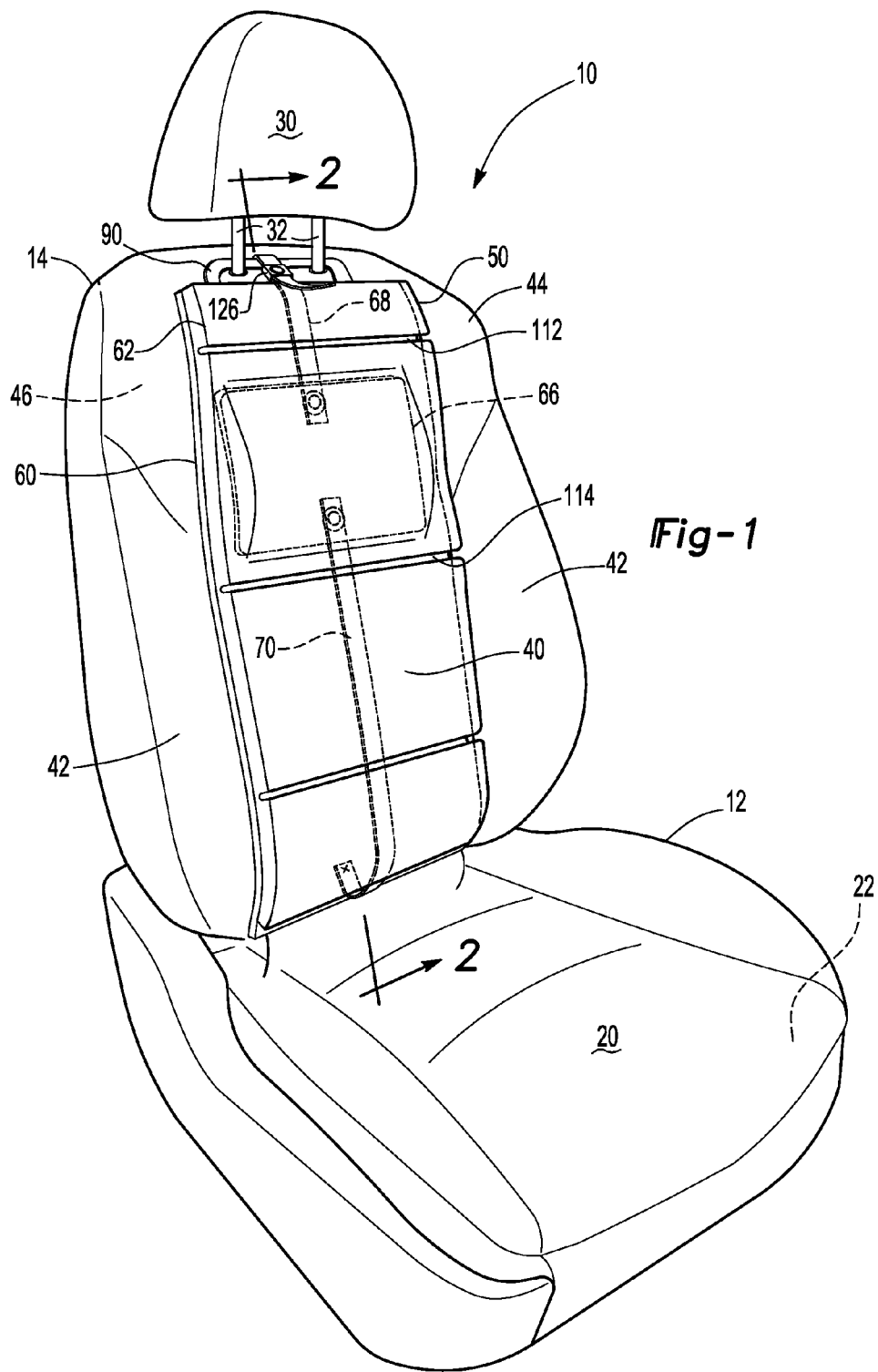
FIG. 1 is a perspective view of a seat assembly and a first embodiment of a thoracic support assembly.

Referring to FIG. 1, an exemplary seat assembly 10 is shown. The seat assembly 10 may be configured for use in vehicular or non-vehicular applications. Vehicular applications may include land vehicles, such as a car or truck, or non-land vehicles, such as aircraft or marine vessels. Non-vehicular applications may include home or office furniture such as chairs or the like. The seat assembly 10 may include a seat bottom 12 and a seat back 14.

The seat bottom 12 may be configured to support the seat of a user or seat occupant. The seat bottom 12 may include a support structure, such as a seat frame, seat pan, and/or support wires that may support and facilitate mounting of components of the seat assembly 10. The seat bottom 12 may also include seat bottom trim cover 20 and a seat bottom cushion 22.

The seat bottom trim cover 20 may be disposed over or upon the seat bottom cushion 22 and may form or provide at least a portion of a visible exterior surface of the seat bottom 12. Moreover, a user or seat occupant may be disposed on the seat bottom trim cover 20 when in a seated position. The seat bottom trim cover 20 may include a plurality of trim panels that may be assembled in any suitable manner, such as by stitching. In addition, the seat bottom trim cover 20 may be made of any suitable material, or materials, such as fabric, leather, vinyl, carpet, or combinations thereof.

The seat bottom cushion 22 may be at least partially concealed by the seat bottom trim cover 20 and may be directly or indirectly supported by the support structure of the seat bottom 12. The seat bottom cushion 22 may be made of any suitable material, such as foam.

Figure 2:
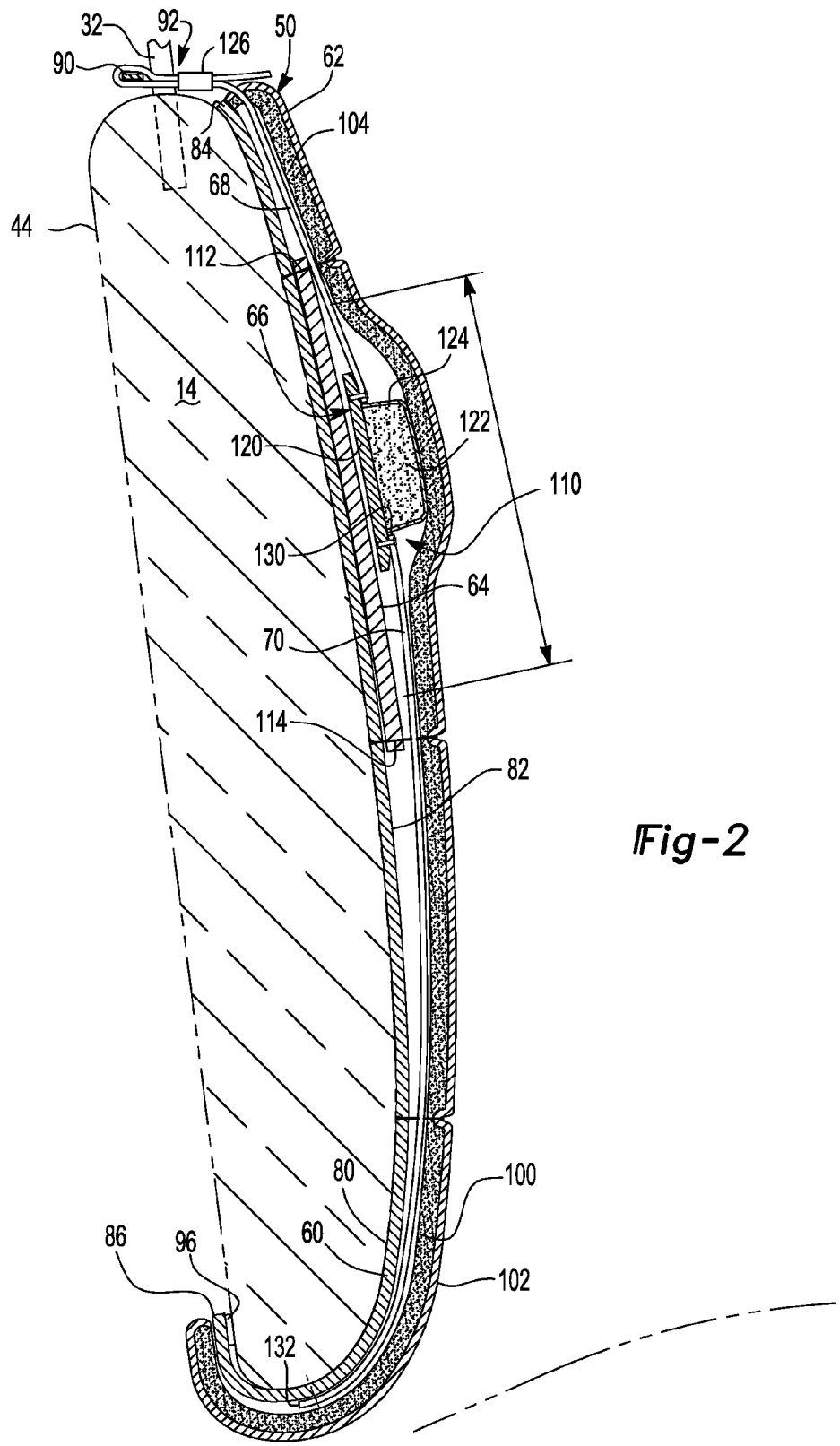
FIG. 2 is a section view of the thoracic support assembly of FIG. 1.

The seat back 14 may be configured to support the back of a user or seat occupant. The seat back 14 may include a support structure, such as a seat frame, seat pan, and/or support wires that may support and facilitate mounting of components of the seat assembly 10. In FIG. 2, a simplified representation of the seat back 14 is shown that does not include all of the internal components of the seat back 14 for clarity. In at least one embodiment, the seat back 14 may be pivotally disposed on the seat bottom 12 and may include a head restraint assembly 30 that may be disposed proximate a top of the seat back 14. One or more support posts 32 may couple the head restraint assembly 30 to the support structure of the seat back 14. The seat back 14 may also include a center seating region 40 and a plurality of side bolsters 42. The side bolsters 42 may extend outwardly or forwardly from the center seating region 40 and may be disposed proximate and may extend along opposite sides of the center seating region 40. As such, the side bolsters 42 may generally extend along opposing lateral sides of the seat back 14 between the top and bottom of the seat back 14. The seat back 14 may also include a seat back trim cover 44 and a seat back cushion 46.

The seat back trim cover 44 may be disposed over or upon the seat back cushion 46 and may form or provide at least a portion of a visible exterior surface of the seat back 14. The seat back trim cover 44 may include a plurality of trim panels that may be assembled in any suitable manner, such as by stitching. In addition, the seat back trim cover 44 may be made of any suitable material, or materials, such as fabric, leather, vinyl, carpet, or combinations thereof.

The seat back cushion 46 may be at least partially concealed by the seat back trim cover 44 and may be directly or indirectly supported by the support structure of the seat back 14. The seat back cushion 46 may be made of any suitable material, such as foam.

A thoracic support assembly 50 may be disposed on the seat back 14. The thoracic support assembly 50 may be configured to support a thoracic region 52 of a user's spine 54, which is best shown in FIG. 7, when the user is seated against the thoracic support assembly 50. As is best shown in FIG. 7, the thoracic region 52 may include and extend between the T1 and the T12 vertebrae and may be disposed between a cervical region 56 and a lumbar region 58. The cervical region 56 may include the C1 to C7 vertebrae. The lumbar region 58 may include the L1 to L5 vertebrae. A sacral or pelvic region of the spine 54 may be disposed below the lumbar region 58.

It is believed that supporting the thoracic region 52 of the spine 54 may support as much as one-third of the upper body mass of a person and may help reduce associated load forces. Loads on the muscles, vertebrae and discs in the lumbar region 58 and/or the sacral region of the spine 54 may be reduced by increasing support of the upper body mass, which may help reduce fatigue in these areas. The current prevalent comfort back supporting technology for the furniture and transportation fields focuses on the lumbar region 58 rather than the thoracic region 52 to provide relief from fatigue.

Referring to FIGS. 1 and 2, a first embodiment of a thoracic support assembly 50 is shown. The thoracic support assembly 50 may include a backing 60, a cover 62, an intermediate layer 64, a thoracic support pad 66, a first adjustment strap 68, and a second adjustment strap 70.

The backing 60 may be adapted to be disposed on the seat back 14. For example, the backing 60 may be disposed proximate the center seating region 40 and may be located between the side bolsters 42 of the seat back 14. In at least one embodiment, the backing 60 may include a first surface 80, a second surface 82, an upper end 84, and a lower end 86.

The first surface 80 may face toward and may engage the seat back trim cover 44 when the thoracic support assembly 50 is installed on a seat back 14.

The second surface 82 may be disposed opposite the first surface 80. The second surface 82 may be disposed proximate and may engage the cover 62.

The upper end 84 may be disposed proximate the top of the seat back 14. The upper end 84 may include an upper mounting feature 90 that may be configured to mount the thoracic support assembly 50 to the seat back 14. The upper mounting feature 90 may be provided in various configurations. For example, the upper mounting feature 90 may form an opening 92 or may be configured as an opening 92 that may extend around one or more support posts 32 of the head restraint assembly 30. For instance, the head restraint assembly 30 may be removed from the seat back 14 and the opening 92 may be aligned to receive the support post(s) 32 when the head restraint assembly 30 is reinstalled. Alternatively, the opening 92 may be formed by one or more portions of the backing 60 or one or more mounting straps that may extend from the backing 60 and may be fastened around the support post(s) 32, such as by tying the portions or straps together or by fastening the portions were straps together with a snap, buckle, hook and loop fastener like Velcro®, or the like. As another example, the upper mounting feature 90 may be coupled to the seat back trim cover 44, such as with an adhesive or hook and loop fastener. The upper mounting feature 90 may also be coupled to a mounting strap that may extend from the lower end 86 of the backing 60. Such a mounting strap may extend along a back side of the seat back 14 to the upper mounting feature 90 and may be coupled to the upper mounting feature 90 in any suitable manner, such as with a fastener, like a snap, buckle, hook and loop fastener, or the like.

The lower end 86 may be disposed opposite the upper end 84. In addition, the lower end 86 may be disposed proximate the bottom of the seat back 14. In at least one embodiment, the lower end 86 may be coupled to the seat bottom 12 and/or the seat back 14. For example, the lower end 86 may be inserted between the seat bottom 12 and the seat back 14 and may be secured to the seat bottom trim cover 20 or the seat back trim cover 44 in any suitable manner, such as with a fastener 96, like a snap or hook and loop fastener that may engage a compatible region of the trim cover.

The cover 62 may be disposed proximate the backing 60. In addition, the cover 62 may be disposed proximate the center seating region 40 and may be located between the side bolsters 42 of the seat back 14. The cover 62 may be coupled to and may be fixedly positioned with respect to the backing 60. For example, the cover 62 may be coupled to the backing 60 in any suitable manner, such as with an adhesive, stitching, hook and loop fastener, or combinations thereof. The cover 62 may include a first cover surface 100 and a second cover surface 102.

The first cover surface 100 may face toward and may engage the second surface 82 of the backing 60. The first cover surface 100 may also face toward and may engage a portion of the first adjustment strap 68 and the second adjustment strap 70.

The second cover surface 102 may be disposed opposite the first cover surface 100. The second cover surface 102 may form a visible exterior surface of the thoracic support assembly 50 and may face toward and may engage a user when the thoracic support assembly 50 is installed on a seat back 14 and a user is seated against the thoracic support assembly 50.

The cover 62 may also include one or more layers. In the embodiment shown in FIG. 2, the cover 62 includes the seat back trim cover 44 and a padding layer 104. The padding layer 104 may be disposed on a side of the seat back trim cover 44 that may face toward the backing 60. The padding layer 104 may have any suitable configuration and may be made of any suitable material. For example, the padding layer 104 may be made of foam or a mesh spacer fabric.

The intermediate layer 64 may be disposed between the backing 60 and the cover 62. The intermediate layer 64 may cooperate with the cover 62 to define a pocket 110 that may receive the thoracic support pad 66. The pocket 110 may be configured to constrain movement of the thoracic support pad 66 such that the thoracic support pad 66 may be aligned with and may be configured to support the thoracic region 52 of the user's spine 54. As is best shown in FIG. 2, the intermediate layer 64 may be disposed between and may be spaced apart from the upper end 84 and the lower end 86 of the backing 60.

The intermediate layer 64 may be coupled to the cover 62 at or along an upper attachment 112 and a lower attachment 114. The upper attachment 112 may define an upper limit of the pocket 110 that may limit upward movement of the thoracic support pad 66, or movement of the thoracic support pad 66 toward the upper end 84. The lower attachment 114 may be spaced apart from the upper attachment 112 and may define a lower limit of the pocket 110 that may limit downward movement of the thoracic support pad 66, or movement of the thoracic support pad 66 toward the lower end 86. The intermediate layer 64 may be coupled to the cover 62 at the upper attachment 112 and at the lower attachment 114 in any suitable manner, such as with an adhesive, fastener, or stitching that may extend between the lateral sides or lateral edges of the thoracic support assembly 50. Such fasteners or stitching may also extend through the backing 60 in one or more embodiments.

The thoracic support pad 66 may be movably disposed between the backing 60 and the cover 62. For example, the thoracic support pad 66 may be disposed in the pocket 110 between the intermediate layer 64 and the padding layer 104 of the cover 62. The thoracic support pad 66 may be disposed proximate and may move along the center seating region 40 of the seat back 14. As such, the thoracic support pad 66 may be completely disposed between the side bolsters 42 in one or more embodiments. In at least one embodiment, the thoracic support pad 66 may include a backing plate 120, a thoracic pad 122, and a thoracic pad cover 124.

The backing plate 120 may be disposed proximate or may face toward the backing 60. The backing plate 120 may have a generally flat or planar configuration and may be configured to slide along the intermediate layer 64 between the upper attachment 112 and the lower attachment 114. The backing plate 120 may be configured to support the thoracic pad 122 and may be made of a generally rigid material, such as a polymeric material, to help distribute load forces.

The thoracic pad 122 may be disposed on the backing plate 120. More specifically, the thoracic pad 122 may be disposed on a surface of the backing plate 120 that may face toward the cover 62. The thoracic pad 122 may be made of any suitable material or materials, such as foam or a mesh spacer fabric. The thoracic pad 122 may completely cover and may separate the backing plate 120 from the cover 62 in one or more embodiments.

The thoracic pad cover 124, if provided, may be disposed proximate the thoracic pad 122. The thoracic pad cover 124 may be disposed between the thoracic pad 122 and the cover 62 to help facilitate movement of the thoracic support assembly 50 and/or to protect or inhibit damage to the thoracic pad 122. For example, the thoracic pad cover 124 may be made of a film or fabric that may readily slide along the cover 62, such as along the padding layer 104. As such, the thoracic pad cover 124 may help facilitate movement of the thoracic support assembly 50 and may help inhibit tearing of the thoracic pad 122 and/or the padding layer 104.

The first adjustment strap 68 may help position the thoracic support assembly 50 in the pocket 110. The first adjustment strap 68 may extend from the thoracic support pad 66 toward the top of the seat back 14. For example, the first adjustment strap 68 may extend from the backing plate 120 toward the upper end 84 of the backing 60.

The first adjustment strap 68 may extend between the cover 62 and the intermediate layer 64. For example, the first adjustment strap 68 may extend through a gap in the upper attachment 112 or a region where the upper attachment 112 permits movement of the first adjustment strap 68. As such, the first adjustment strap 68 may be free to slide between the cover 62 and the backing 60 and/or intermediate layer 64 when the first adjustment strap 68 is pulled to move the thoracic support pad 66 upward or toward the upper attachment 112. Accordingly, a user may exert force on the first adjustment strap 68 to manually adjust the position of the thoracic support pad 66 in an upward direction to a desired location. The first adjustment strap 68 may then be coupled to the thoracic support assembly 50 to hold the first adjustment strap 68 and the thoracic support pad 66 in the desired location. For example, the first adjustment strap 68 may extend to and may be coupled to the upper mounting feature 90 of the backing 60 to secure the first adjustment strap 68. A fastening element 126, such as a snap, buckle, hook and loop fastener, or the like may be disposed proximate or may be coupled to the upper mounting feature 90 and may be provided to hold the first adjustment strap 68 in a stationary position. It is also contemplated that the first adjustment strap 68 may be configured to be coupled to part of the seat back 14, such as the support post 32 and/or the seat back trim cover 44.

The second adjustment strap 70 may also help position the thoracic support pad 66 in the pocket 110. The second adjustment strap 70 may extend from the thoracic support pad 66 toward the bottom of the seat back 14. For example, the second adjustment strap 70 may have a first strap end 130 and a second strap end 132. The first strap end 130 may be fixedly positioned on the thoracic support pad 66. For instance, the first strap end 130 may be disposed proximate and may extend from the backing plate 120. The second strap end 132 may be disposed opposite the first strap end 130 and may be attached to or may be fixedly coupled to the thoracic support assembly 50. For instance, the second strap end 132 of the second adjustment strap 70 may be attached to the backing 60, cover 62, intermediate layer 64, or combinations thereof. Moreover, the second strap end 132 of the second adjustment strap 70 may be attached to the backing 60, cover 62, and/or intermediate layer 64 outside of the pocket 110 and below the lower attachment 114. As such, the second adjustment strap 70 may be disposed opposite the first adjustment strap 68 and may extend in an opposite direction from the thoracic support pad 66 from the first adjustment strap 68. The second adjustment strap 70 may be coupled to or may be fixedly disposed on the thoracic support assembly 50 and/or the thoracic support pad 66 in any suitable manner, such as with an adhesive, fastener, stitching, or combinations thereof.

The second adjustment strap 70 may extend between the cover 62 and the intermediate layer 64. For instance, the second adjustment strap may extend through a gap in the lower attachment 114. As such, the second adjustment strap 70 may be free to slide between the cover 62 and the backing 60 and/or the intermediate layer 64. The second adjustment strap 70 may exert a tensile force upon the thoracic support pad 66 that may bias the thoracic support pad 66 to move downward or toward the lower attachment 114. For example, the second adjustment strap 70 may be made of elastic or an elastomeric material. As such, the second adjustment strap 70 may continuously pull on the thoracic support pad 66 and may move the thoracic support pad 66 toward the lower attachment 114 when the first adjustment strap 68 is not secured to inhibit movement of the thoracic support pad 66. Thus, positioning of the thoracic support pad 66 toward the upper attachment 112 may be accomplished by pulling on the first adjustment strap 68 while positioning of the thoracic support pad 66 toward the lower attachment 114 may be accomplished by releasing the first adjustment strap 68.

Figure 3:
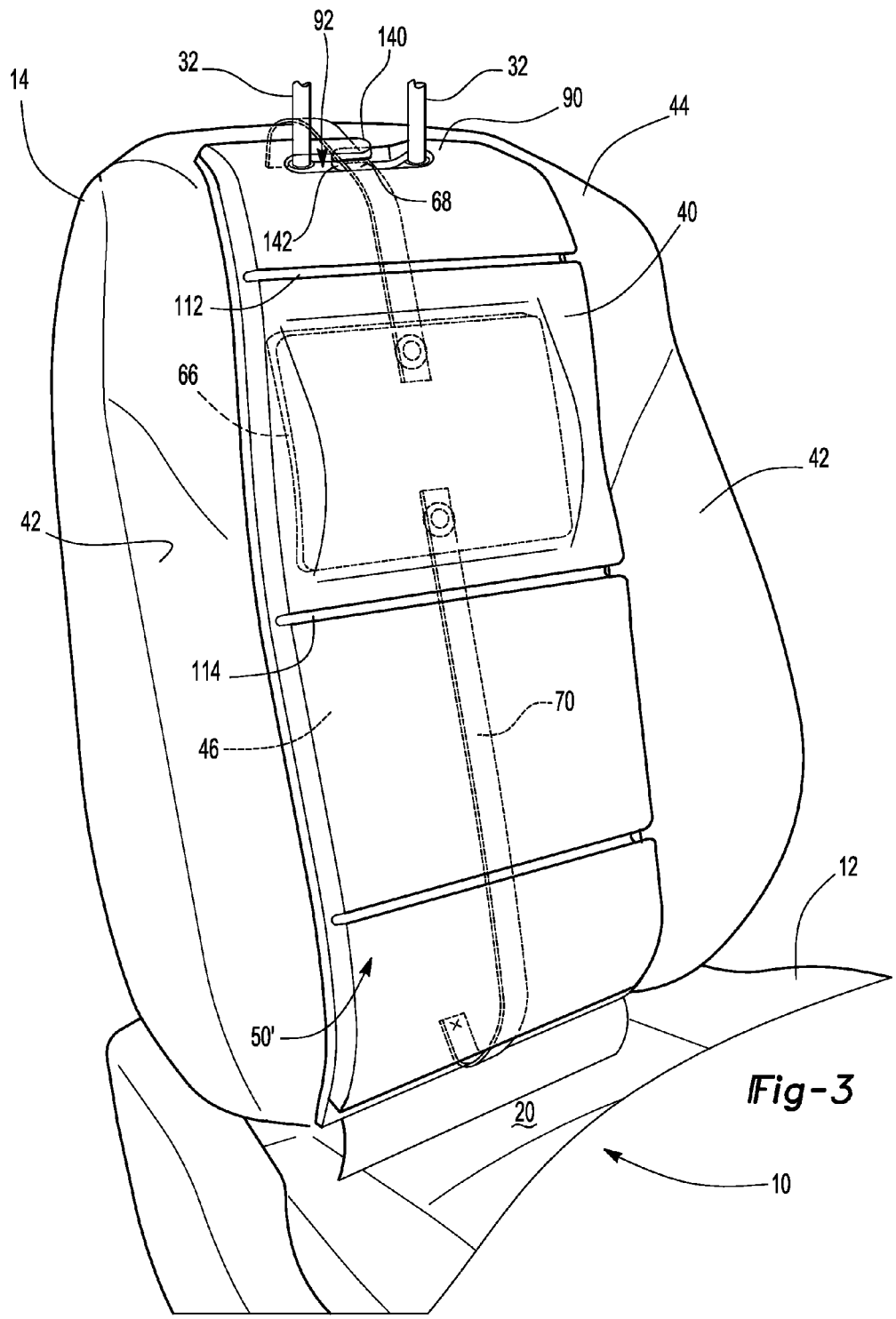
FIG. 3 is a perspective view of a seat assembly and a second embodiment of a thoracic support assembly.

Referring to FIG. 3, a second embodiment of a thoracic support assembly 50' is shown. In this embodiment, the thoracic support assembly 50' may include a backing 60, a cover 62, an intermediate layer 64, a thoracic support pad 66, a first adjustment strap 68, and a second adjustment strap 70 like that shown in FIG. 1. The upper end 84 of the backing 60 may have an upper mounting feature 90 that may have integral first and second portions 140, 142 that may extend around the support post(s) 32 and cooperate to define the opening 92. The first portion 140 and the second portion 142 may be coupled with a fastener, such as a snap or a hook and loop fastener. In addition, the first adjustment strap 68 may be configured to extend toward or along a back side of the seat back 14 where it may be secured to the backing 60 with another fastener, such as a snap or a hook and loop fastener.

Figure 4:
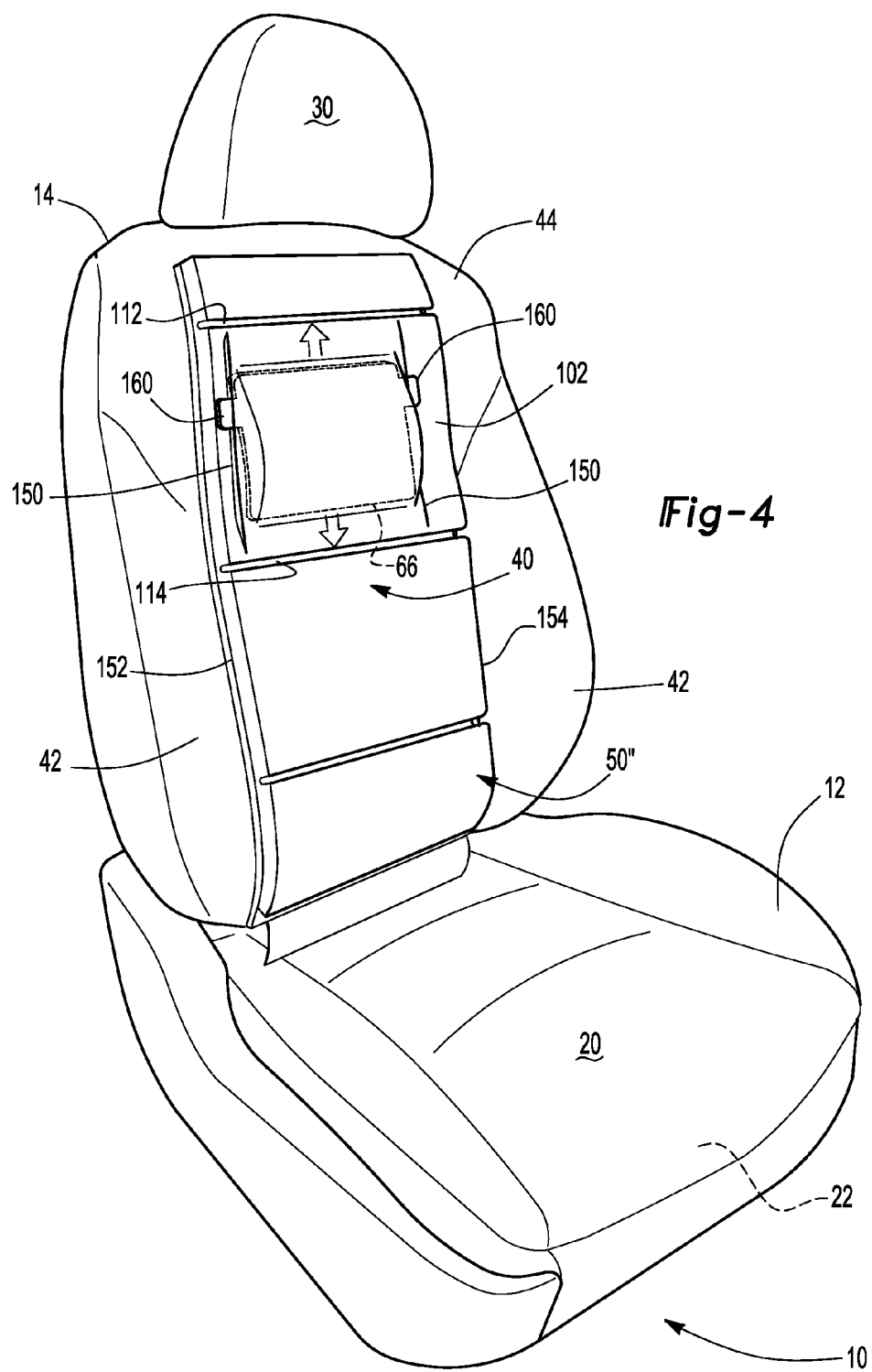
FIG. 4 is a perspective view of a seat assembly and a third embodiment of a thoracic support assembly.

Referring to FIG. 4, a third embodiment of a thoracic support assembly 50" is shown. In this embodiment, the thoracic support assembly 50" may include a backing 60, a cover 62, an intermediate layer 64, and a thoracic support pad 66, but the first adjustment strap 68 and the second adjustment strap 70 may be omitted.

The cover 62 may have one or more slots 150. In FIG. 4, two slots 150 are shown that may be disposed opposite each other and that extend in a generally vertical direction, or a direction that extends from the upper attachment 112 toward the lower attachment 114. As such, the slot 150 may be disposed between and may extend between the upper end 84 and the lower end 86 of the backing 60 and between the upper attachment 112 and the lower attachment 114. A slot 150 may be configured as an elongated opening that may extend from the first cover surface 100 to the second cover surface 102. The cover 62 may also have a first lateral edge 152 and a second lateral edge 154. The first lateral edge 152 may be disposed proximate a first side bolster 42 of the seat back 14 while the second lateral edge 154 may be disposed opposite the first lateral edge 152 and may be disposed proximate a second side bolster 42 of the seat back 14. As such, the slots 150 may be disposed proximate the center seating region 40 and may be disposed between and may be spaced apart from the first lateral edge 152 and the second lateral edge 154. Moreover, the slots 150 may be disposed substantially parallel to each other in one or more embodiments.

The thoracic support pad 66 may include one or more adjustment tabs 160. In the embodiment shown, thoracic support pad 66 includes a first adjustment tab 160 that extends through the first slot 150 and a second adjustment tab 160 extends through the second slot 150. Each adjustment tab 160 may be disposed proximate and may extend from the backing plate 120. For example, a first adjustment tab 160 may extend from the backing plate 120 toward the first lateral edge 152 while the second adjustment tab 160 may extend from an opposite side of the backing plate 120 toward the second lateral edge 154. The adjustment tabs 160 may be disposed proximate and may engage the second cover surface 102. A user may exert force upon one or more adjustment tabs 160 to move the thoracic support pad 66 within the pocket 110 to a desired position. For example, a user may exert force upon an adjustment tab 160 and push it toward the top of the seat back 14 to move the thoracic support pad 66 toward the upper attachment 112. A user may also exert force on the adjustment tab 160 to push it toward the bottom of the seat back 14 to move the thoracic support pad 66 toward the lower attachment 114. The thoracic support pad 66 may remain in a desired position when sufficient force is not applied to an adjustment tab 160 to move the thoracic support pad 66 due to friction between the thoracic support pad 66 and the cover 62 and/or the intermediate layer 64.

Figure 5:
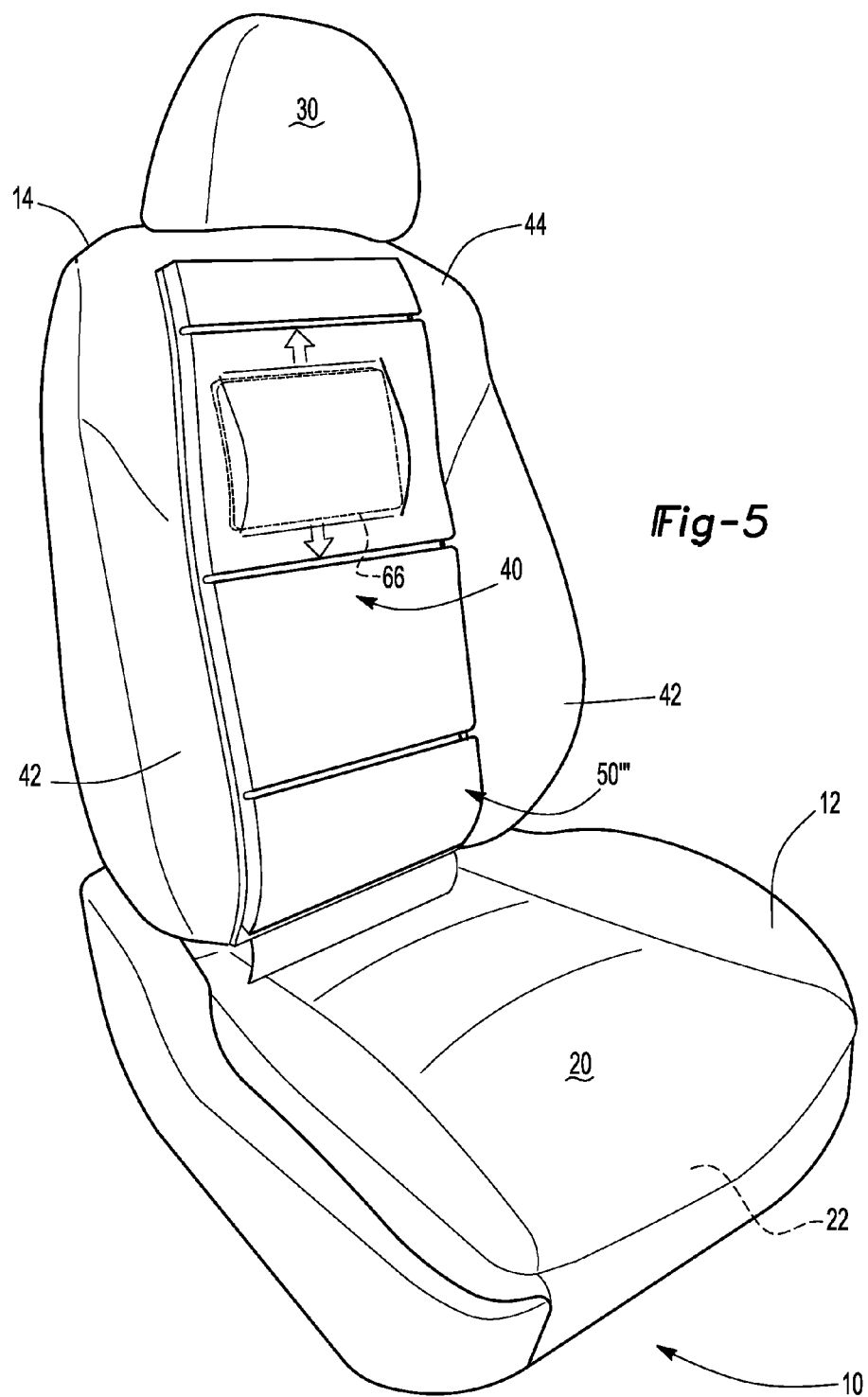
FIG. 5 is a perspective view of a seat assembly and a fourth embodiment of a thoracic support assembly.

Referring to FIGS. 5 and 6, a fourth embodiment of a thoracic support assembly 50''' is shown. In this embodiment, the thoracic support assembly 50''' may include a cover 62 and a thoracic support pad 66. The backing 60, intermediate layer 64, first adjustment strap 68, and the second adjustment strap 70 may be omitted. In addition, the upper mounting feature 90 may be provided with the cover 62 rather than the backing 60. For instance, the upper mounting feature 90 may be disposed proximate an upper end of the cover 62.

The cover 62 may be adapted to be disposed on the seat back 14. More specifically, the first cover surface 100 may face toward and may engage the seat back trim cover 44 when the thoracic support assembly 50''' is disposed on the seat back 14. The thoracic support pad 66 may be positionable upon the first cover surface 100. For example, the thoracic support pad 66 may include an engagement feature 170, such as a portion of a hook and loop fastener, that may be configured to engage and attach directly to the first cover surface 100 or a corresponding engagement feature 172 on the cover 62, such as portion of a hook and loop fastener that may be disposed on the first cover surface 100. The thoracic support pad 66 may include a backing plate 120 and a thoracic pad 122 and optionally a thoracic pad cover 124, which is not shown in FIG. 6. The backing plate 120 may be adapted to be disposed on the seat back trim cover 44. The thoracic pad 122 may be disposed proximate the engagement feature 170. As such, the thoracic support pad 66 may be peeled off of the first cover surface 100 and manually positioned and reattached to the first cover surface 100 at a desired location to support the thoracic region 52 of a user's spine 54. The first cover surface 100 and/or the engagement feature 170 may be configured such that the thoracic support pad 66 may only be attached to the cover 62 in a thoracic region 52, or in a region that is disposed above the lumbar region 58 of a user's spine 54. For example, in this embodiment and the previous embodiments the thoracic support pad 66 may have a travel distance or may be positionable in a range of approximately 120 mm. In addition, the bottom edge of the thoracic support pad 66 may be positioned approximately 170 mm (or higher) above the bottom of the seat back 14 or the top of the seat bottom 120 to align with and support the thoracic region 52 in one or more embodiments.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

What is claimed is:

1. A thoracic support assembly for a seat back of a seat assembly, the thoracic support assembly comprising:
   a backing adapted to be disposed on the seat back, the backing having an upper end and a lower end disposed opposite the upper end;
   a cover that is disposed proximate the backing;
   a thoracic support pad that is moveably disposed between the backing and the cover;
   a first adjustment strap that extends from the thoracic support pad toward the upper end; and
   a second adjustment strap that extends from the thoracic support pad toward the lower end, wherein the second adjustment strap is elastic and has a first end that is fixedly disposed on the thoracic support pad and a second end that is fixedly disposed on the backing proximate the lower end;
   wherein the first adjustment strap and the second adjustment strap cooperate to adjust a position of the thoracic support pad to support at least a portion of a thoracic region of a user's spine.

2. The thoracic support assembly of claim 1 further comprising an upper mounting feature that is disposed proximate the upper end of the backing and adapted to mount the thoracic support assembly to the seat back.

3. The thoracic support assembly of claim 2 wherein the first adjustment strap extends to the upper mounting feature.

4. The thoracic support assembly of claim 2 wherein the first adjustment strap includes a fastening element that is disposed proximate the upper mounting feature for inhibiting movement of the thoracic support pad.

5. The thoracic support assembly of claim 1 wherein the thoracic support pad includes a backing plate and a thoracic pad disposed on the backing plate, wherein the backing plate is disposed proximate the backing and the thoracic pad is disposed proximate the cover.

6. The thoracic support assembly of claim 5 wherein the first adjustment strap and the second adjustment strap extend from the backing plate.

7. The thoracic support assembly of claim 1 further comprising an intermediate layer that is disposed between the backing and the cover, wherein the intermediate layer cooperates with the cover to define a pocket that receives the thoracic support pad, wherein the pocket constrains movement of the thoracic support pad such that the thoracic support pad is configured to support the thoracic region and not support a lumbar region of the user's spine.

8. The thoracic support assembly of claim 7 wherein the intermediate layer is disposed between and spaced apart from the upper end and the lower end of the backing and fixedly coupled to the cover.

9. The thoracic support assembly of claim 7 wherein the first adjustment strap and the second adjustment strap extend between the cover and the intermediate layer.

10. The thoracic support assembly of claim 7 wherein the thoracic support pad includes a backing plate and a thoracic pad disposed on the backing plate, wherein the backing plate is moveably disposed on the intermediate layer.

11. The thoracic support assembly of claim 1 wherein the first adjustment strap is spaced apart from and does not engage the second adjustment strap.

12. A thoracic support assembly for a seat back of a seat assembly, the thoracic support assembly comprising:
    a backing adapted to be disposed on the seat back, the backing having an upper end and a lower end disposed opposite the upper end;
    a cover that is disposed proximate the backing;
    a thoracic support pad that is moveably disposed between the backing and the cover;
    a first adjustment strap that extends from the thoracic support pad toward the upper end; and
    a second adjustment strap that extends from the thoracic support pad toward the lower end; and
    an intermediate layer that is disposed between the backing and the cover, wherein the intermediate layer cooperates with the cover to define a pocket that receives the thoracic support pad;
    wherein the first adjustment strap and the second adjustment strap cooperate to adjust a position of the thoracic support pad to support at least a portion of a thoracic region of a user's spine and the first adjustment strap and the second adjustment strap extend between the cover and the intermediate layer.

13. The thoracic support assembly of claim 12 wherein the intermediate layer cooperates with the cover to define a pocket that receives the thoracic support pad, wherein the pocket constrains movement of the thoracic support pad such that the thoracic support pad is configured to support the thoracic region and not support a lumbar region of the user's spine.

14. The thoracic support assembly of claim 12 wherein the first adjustment strap is spaced apart from and does not engage the second adjustment strap.

15. The thoracic support assembly of claim 12 wherein the thoracic support pad includes a backing plate and a thoracic pad disposed on the backing plate, wherein the backing plate is disposed proximate the backing and the thoracic pad is disposed proximate the cover.

16. The thoracic support assembly of claim 15 wherein the first adjustment strap and the second adjustment strap extend from the backing plate.

17. The thoracic support assembly of claim 12 wherein the thoracic support pad is completely disposed above a lumbar region of the user's spine.

18. The thoracic support assembly of claim 12 further comprising an upper mounting feature that is disposed proximate the upper end of the backing and adapted to mount the thoracic support assembly to the seat back.

19. The thoracic support assembly of claim 12 wherein the second adjustment strap is elastic and has a first end that is fixedly disposed on the thoracic support pad and a second end that is fixedly disposed on the backing proximate the lower end.

20. The thoracic support assembly of claim 12 wherein the first adjustment strap is spaced apart from and does not engage the second adjustment strap.

* * * * *